United States Patent [19]  
Magó née Karácsony et al.

[11] 3,901,893  
[45] Aug. 26, 1975

[54] NEW DIHYDRO-LYSERGIC ACID DERIVATIVE
[75] Inventors: Erzsebet Magó née Karácsony; József Borsi; Tibor Balogh; Lajos Wolf, all of Budapest, Hungary
[73] Assignee: Richter Yedeon Vegeszeti Gyar Rt, Budapest, Hungary
[22] Filed: June 1, 1973
[21] Appl. No.: 366,241

Related U.S. Application Data
[63] Continuation-in-part of Ser. No. 142,535, May 12, 1971, abandoned.

[30] Foreign Application Priority Data
May 18, 1970 Hungary.............................. GO 1135

[52] U.S. Cl............................... 260/285.5; 424/261
[51] Int. Cl.². ........................................ C07D 519/02
[58] Field of Search .................................. 260/285.5

[56] References Cited
UNITED STATES PATENTS
2,533,699   12/1950   Stoll et al. ......................... 260/285.5
2,673,850   3/1954    Stoll et al. ......................... 260/285.5
2,946,796   7/1960    Rudner ............................. 260/285.5

Primary Examiner—Donald G. Daus  
Assistant Examiner—D. B. Springer  
Attorney, Agent, or Firm—Young & Thompson

[57] ABSTRACT

A compound of the formula

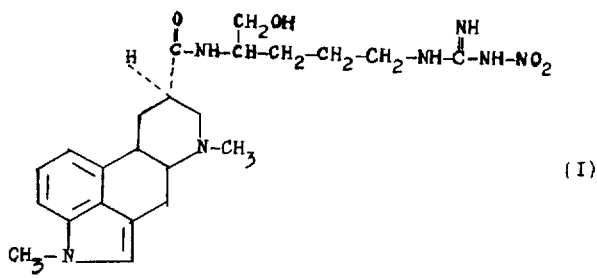

(I)

is prepared by hydrogenating the corresponding 9,10-unsaturated lysergic acid derivative.

The new compound of the formula (I) and its acid addition salts possess valuable antiserotonine activities.

1 Claim, No Drawings

NEW DIHYDRO-LYSERGIC ACID DERIVATIVE

This application is a continuation-in-part of application Ser. No. 142,535 filed May 12, 1971, now abandoned.

This invention relates to a new lysergic acid derivative and to its acid addition salts. More particularly, this invention relates to 1-methyl-dihydro-lysergyl-ω-nitro-L-argininole and to its acid addition salts, as well as to a process for preparing these compounds.

The new compound according to the invention has the formula

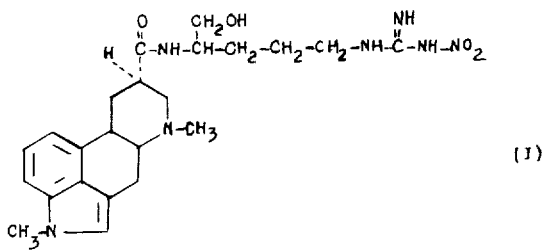

Compounds of ergolene skeleton have been playing a useful part in therapeutic applications. The main efforts of researches have been worldwide directed at the synthesis of the so-called natural derivatives and to the preparation of lysergic amides formed chiefly with aminoalcohols. These compounds have highly varied multipurpose effects. Lysergic acid amino alcohols as a rule exhibit a marked specific antiserotonine effect, but they are known to involve undesirable side effects on the nervous systems and pathological changes on the arteries.

According to the known methods for preparing 9,10-dihydro-lysergic acid derivatives, the corresponding lysergic acid derivatives are catalytically hydrogenated, using palladium, such as palladium-on-charcoal as catalyst (Stoll and Hofmann: Helv. Chim. Acta 26, 922 /1943/).

The object of the present invention is to provide a new compound belonging to the dihydro-lysergic acid series which shows a specific, marked serotonin-antagonistic effect, has no toxic effect on the central nervous system, does not affect the heart or the kidneys either, and causes no pathologic changes in the area of the great arteries.

This invention is based on the discovery that the new lysergic acid derivative of the formula (I) as well as its pharmaceutically acceptable acid addition salts possess the above-mentioned favourable pharmacological properties.

The new compound of the formula (I) as well as its acid addition salts formed with organic or inorganic acids can be prepared e.g. by hydrogenating a compound of the formula

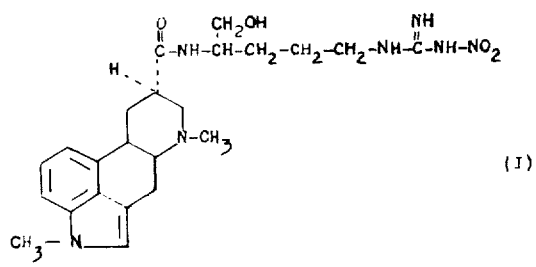

or its salts in a solution consisting of liquid ammonia in an organic solvent, with an alkali metal, preferably sodium or potassium or their mixtures, whereafter, if desired, acid addition salts are formed with organic or inorganic acids in a manner known per se.

In accordance with a preferable embodiment of this process a compound of the formula (II) is dissolved in liquid ammonia at a temperature not exceeding −40°C, then, if desired, alcohol, ether or tetrahydrofuran is added, whereafter the mixture is stirred with a comminuted alkali metal until the double bond in 9,10 position is saturated. The temperature of the reaction mixture is ensured with external cooling or by continuous evaporation of the ammonia. The course of the reaction can be followed e.g. by layer chromatography. After the reaction has been completed, the product can be obtained from the reaction mixture by adding to the solution a solvent reacting with the excess alkali metal, such as alcohol, acetone or the like, evaporating the ammonia with mild heating in vacuo, and then separating the product from the reaction mixture by means of the usual methods.

The compound of the formula (I), when treated with inorganic or organic acids, forms salts which are of crystalline state. For salt formation mineral acids, such as sulphuric acid, hydrogen bromide, etc., as well as strong organic acids, e.g. tartaric acid, maleic acid, ethanesulphonic acid etc., can be employed.

The new compound according to the invention exhibits valuable therapeutical effects. The pharmacological tests carried out in order to determine the activities of the new compound were as follows:

The in vitro examinations were carried out on isolated rat uterus sensitized with 1 mg./kg. s.c. doses of diethylstylbestrol (Gaddum, J. H. and Hammed, L. A.: Brit. J. Pharmacol. 9, 240 /1954/; Lanz, U., Cerletti, A. and Rothlin, E.: Helvet. Physiol. Acta 13, 207 /1955/). The doses causing 50 % inhibition were determined according to the probit analysis of Miller, Becker and Tainter (J. of Pharm. Exp. Ther. 92, 260 /1948/).

The serotonine-antagonizing activity was measured under in vitro conditions by the rat-paw oedema test. In the screening examinations groups consisting of 8 rats each were used, and the compounds were injected subcutaneously into the animals in a dosis of 1 mg./kg., and the paw oedema evoked 90 minutes after this treatment was measured according to the method of Bonta (Arch. int. Pharmacodyn. 132, 147 /1961/). Oedema was provoked using 5 μg./paw doses of serotonine-creatinine-sulfate, by administering this substance 30 minutes after the administration of the compound to be tested. In the detailed analysis the above test was repeated using the compounds in question in several other dosage levels. The controls were treated with physiological saline solution, and the percentage inhibition was calculated on the basis of the results observed in the control group.

The blocking of the vascular effects of serotonine was examined with the Page method (Amer. J. Physiol. 174, 436 /1953/).

The electroencephalographic tests were carried out on awake cats with chronic electrodes. Chromium-nickel bipolar electrodes were inserted into two sensomotoric territories of the cortex, and into both sides of the hyppocampus, the nucleus caudatus and the formatio reticularis, and the signs were registered using a Schwarzer-type electroencephalograph.

As reference substance, Deseryl (1-methyl-D-lysergic acid butanolamide) was used.

The results of the above tests are summarized in the following Tables.

Table 1

Antiserotonine activity under in vivo and in vitro conditions

| Compound | ED$_{50}$ g./ml. on isolated rat uterus (in vitro) | Percentage inhibition of oedeme provoked with 1 mg./kg. of serotonine (s.c.) (in vivo) |
|---|---|---|
| N-methyl-9,10-dihydro-D-lysergyl-nitro-1-argininol-bimaleate | $3 \times 10^{-11}$ | 67.0 |
| Deseryl | $5 \times 10^{-9}$ | 76.0 |

Table 2

Antiserotonine activity on isolated rat uterus, under in vitro conditions

| Compound | Concentration µg./ml. | No. of animals giving positive response /No. of animals tested | % inhibition | Appr. ED$_{50}$ µg./ml. |
|---|---|---|---|---|
| N-methyl-9,10-dihydro-D-lysergyl-nitro-1-argininol-bimaleate | 0.01 | 12/22 | 54.7 | |
| | 0.02 | 12/15 | 80.0 | 0.01 |
| Deseryl | 0.01 | 4/17 | 23.6 | |
| | 0.02 | 6/9 | 66.6 | 0.017 |

Table 3

Antiserotonine activity examined in rat-paw oedema test

| Compound | No. of animals | Dosis µg./kg. s.c. | % inhibition | ED$_{50}$ µg./kg. s.c. |
|---|---|---|---|---|
| N-methyl-9,10-dihydro-D-lysergyl-nitro-1-argininol-bimaleate | 15 | 3 | 13.8 | |
| | 20 | 10 | 38.1 | |
| | 20 | 30 | 54.3 | 28.0 |
| | 20 | 100 | 64.7 | |
| Deseryl | 25 | 3 | 21.9 | |
| | 45 | 10 | 48.4 | 17.1 |
| | 50 | 30 | 58.8 | |
| | 20 | 100 | 70.0 | |

Table 4

Duration of antiserotonine activity in rat-paw oedema test

| Compound | Dosis µg./kg. s.c. | Percentage inhibition of the paw oedema provoked by serotonine | | |
|---|---|---|---|---|
| | | 1 hour | 2 hours | 3 hours after the administration of serotonine |
| N-methyl-9,10-dihydro-D-lysergyl-nitro-1-argininol bimaleate | 100 | 64.8 | 43.4 | 40.8 |
| Deseryl | 100 | 70.0 | 52.6 | 43.9 |

Table 5

Effect of the compounds on serotonine vasopression examined on cats made hypotensive with ganglion-blocking agents

| Compound | No. of animals | Dosis µg./kg. i.v. | Percentage inhibition of vasopression |
|---|---|---|---|
| N-methyl-9,10-dihydro-D-lysergyl-nitro-1-argininol-bimaleate | 4 | 100.0 | 39.9 |
| | 4 | 250.0 | 35.3 |
| Deseryl | 4 | 100.0 | 17.7 |
| | 4 | 250.0 | 48.1 |

On the basis of the data listed in the Tables the following conclusions can be drawn:

The hydrogenation of the ergoline skeleton has no substantial effect on the in vitro and in vivo activities (see the data of Table 1). The in vitro activity of the compound according to the invention exceeds in some extent that of the reference substance (see Table 2). The new compound remarkably antagonizes the paw oedema provoked by serotonine, this antagonizing effect is, however, of a lower degree than that of the reference substance (see Table 3). On the other hand, the new compound according to the invention antagonizes the vasopressor activity of serotonine twice more effectively than Deseryl in the same intravenous dosage levels (100 to 250 µg./kg.)

According to our experiments the new compound of the invention is suitable for therapeutical use. In comparison with the known N-alkyl-lysergic acid derivatives, the new compound will presumably cause no fibrotic changes in the organism. The new compound can be used with great advantages in every disorders wherein serotonine displays a pathophysiological role (such as e.g. in carcinoid syndroms as well as in inflammatory, allergic and anaphylaxic reactions). The new compound can widely be used in the therapy of migraine.

The new compound can be converted into pharmaceutical preparations suitable for oral or parenteral administration. The orally administerable preparations may be, for example, tablets, each containing 3 to 30 mg. of active ingredient, while for parenteral administration preferably subcutaneous or intramuscular injections containing 1 to 3 mg. of active agent pro dosage unit are prepared. The injectable preparations may be administered preferably 1 to 3 times a day, while for oral treatment preferably one or two tablets are administered three times a day.

The invention is elucidated in detail by the aid of the following non-limiting Example.

EXAMPLE a. Preparation of 1-methyl-dihydro-lysergic acid 3 g. of sodium metal are dissolved in approximately 300 ml. of liquid ammonia; after dissolution 3.68 g. of thoroughly powdered and dried lysergic acid are added. The reaction mixture is stirred between −30°C and −40°C for 3 to 4 hours. The progress of hydrogenation can be followed by layer chromatography (on a silica gel plate, using a mixture of chloroform:water:methanol in a ratio of 10:1:5). The hydrogenated product shows no fluorescence in ultraviolet light. After completion of the reaction, abs. ethyl-alcohol is added to the mixture in an amount sufficient for removing the blue colour of the solution, then a solution of 4.8 g. of methyl iodide in 5 ml. of abs. ether is added dropwise. The mixture is stirred for further 10 to 15 min., then evaporated to dryness in vacuo. The evaporation residue is wetted with 5 ml. of ethyl alcohol and dissolved with 20 ml. of water. The pH of the solution is adjusted with acetic acid between 7 and 8 while cooling. The 1-methyl-dihydro-lysergic acid is allowed to crystallize in a refrigerator for several days, then filtered, washed with water and acetone, and dried in a vacuum desiccator. M.p.: 235°C with decomposition; $(\alpha)_D^{20} = 111°$ (c = 1, in pyridine).

b. Preparation of 1-methyl-dihydro-lysergic acid chloride hydrochloride

To 3.5 g. of phosphorous pentachloride, dissolved in a mixture of 60 ml. of acetonitrile and 60 ml. of phosphorous trichloride, 2.81 g. of dried 1-methyl-dihydro-lysergic acid are added. A solution is formed temporarily, and after further stirring the 1-methyl-dihydro-lysergic acid chloride hydrochloride is precipitated. The suspension is stirred for 30 minutes in the temperature range from 0° to 5°C, then the reaction mixture is evaporated in vacuo, the residue is suspended in 30 ml. of tetrahydrofuran and washed repeatedly with petroleum ether, finally dried at 40°C in vacuo.

c. Preparation of 1-methyl-dihydro-lysergyl-ω-nitro-L-arginine-methylester 3.1 g. of L-ω-nitro-arginine-methylester hydrochloride are dissolved in 50 ml. of dimethyl formamide with stirring. The solution is diluted with 100 ml. of chloroform, and 8.4 ml. of triethylamine are added. 1-Methyl-dihydro-lysergic acid chloride hydrochloride, as prepared in step (b), are added under cooling with ice and water. The acylation reaction is completed within 1 hour. The reaction mixture is evaporated to dryness in vacuo at low temperature, then it is suspended in 100 ml. of 1 % aqueous tartaric acid solution and in 200 ml. of a 4:1 mixture of chloroform and isopropanol, and the pH of the mixture is adjusted to 8 by means of an aqueous ammonium hydroxide solution. After shaking the organic phase is separated and the shaking is repeated with 4 × 50 ml. of the above mixture of chloroform and isopropanol. The combined organic phases are dried with anhydrous sodium sulphate, then filtered and evaporated to dryness in vacuo. The residue of evaporation is dissolved in chloroform and precipitated in petroleum ether. The precipitate is filtered, washed with petroleum ether and dried in vacuo until constant weight.

d. Preparation of 1-methyl-dihydro-lysergyl-ω-nitro-L-argininole bimaleate 5.0 g. of powdered calcium chloride are dissolved in 200 ml. of abs. ethanol with stirring. After dissolution the ester compound prepared as described in step (c) above is added. The solution is cooled with ice water to 0° – 2°C, and 2.5 g. of sodium borohydride are added with vigorous stirring. The reduction is completed in 4 hours. The pH of the solution is then adjusted to 6 by means of 5N hydrochloric acid, and the solution is evaporated to syrup thickness at a low temperature in vacuo. The residue of evaporation is dissolved in 100 ml. of water and rendered alkaline by means of ammonium hydroxide to pH = 8, then shaken with 8 × 50 ml. of a 4:1 mixture of chloroform and isopropanol. The combined organic phases are dried, filtered and evaporated to dryness. The isomer is removed from the crude product by silica gel chromatography. Elution is performed with a 90 : 4.5 : 30 mixture of chloroform : water : ethanol. From the purified product a salt is formed by adding alcoholic maleic acid. M.p. 144°–145°C; $(\alpha)_D^{20} = -49°$ (c = 0,5, in 50 % aqueous ethanol).

What we claim is:

1. A compound of the formula

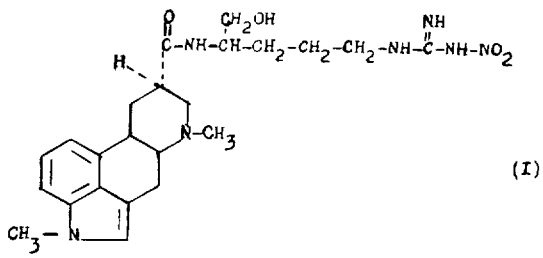

(I)

or its acid addition salts formed with pharmaceutically acceptable acids.

* * * * *